P. A. NILSON.
FLYING MACHINE.
APPLICATION FILED JAN. 12, 1911.

1,009,780.

Patented Nov. 28, 1911.
6 SHEETS—SHEET 1.

Witnesses

Inventor
Pehr A. Nilson,
By Joshua R. H. Potts,
Attorney

UNITED STATES PATENT OFFICE.

PEHR A. NILSON, OF PHILADELPHIA, PENNSYLVANIA.

FLYING-MACHINE.

1,009,780.  Specification of Letters Patent.  Patented Nov. 28, 1911.

Application filed January 12, 1911. Serial No. 602,158.

*To all whom it may concern:*

Be it known that I, PEHR A. NILSON, a citizen of the United States, residing at Philadelphia, in the county of Philadelphia and State of Pennsylvania, have invented certain new and useful Improvements in Flying-Machines, of which the following is a specification.

My invention relates to improvements in flying machines, the primary object of the invention being to provide a machine of this character composed of aluminum or other light sheet metal with an improved arrangement of telescoping body and folding wings, which will allow the machine to occupy a comparatively small space when not in use.

A further object is to provide the machine with improved spring kickers which serve to elevate the machine, allowing it to rise from a given point and overcoming the necessity of a running start as is common with machines in use.

A further object is to provide these kickers with web feet and sharp toe nails which will grasp firmly in the ground insuring an upward and forward movement of the ship when starting from the ground, and which when the machine is in the water will propel the ship through the water, or will so engage the water as to cause the ship to jump out of the water.

A further object is to provide a ship of this character which may alight on the water, move along the water and jump from the water, and move through the air whenever desired.

A further object is to provide an improved construction and arrangement of propellers employing worm or screw propellers in addition to the ordinary rotary propeller, and also provide improved vibrating wings operating much like the wings of an ordinary insect, which are adapted to maintain the machine in the air or travel at a very low speed.

A further object is to provide improved means for steering the ship, in which pivoted steering blades are provided to steer the machine to right or left, and are connected to flexible ends which are moved upwardly and downwardly to guide the machine vertically.

A further object is to provide improvements of this character which may of course be adapted for any size of machine, but especially designed as a machine for carrying passengers, and a means for transportation of freight, and which may be equipped with all up-to-date apparatus such as wireless telegraphy and be fitted up for the comfort of passengers for an extended journey, provision being made for the accommodation of an aviator and an engineer, and such other crew as the ship may require, and the machine is preferably designed in so far as possible to resemble a bird with the maximum of weight below to insure a stability of the machine in treacherous wind.

With these and other objects in view, the invention consists in certain novel features of construction and combinations and arrangements of parts, as will be more fully hereinafter described and pointed out in the claims.

In the accompanying drawings.

Figure 1:
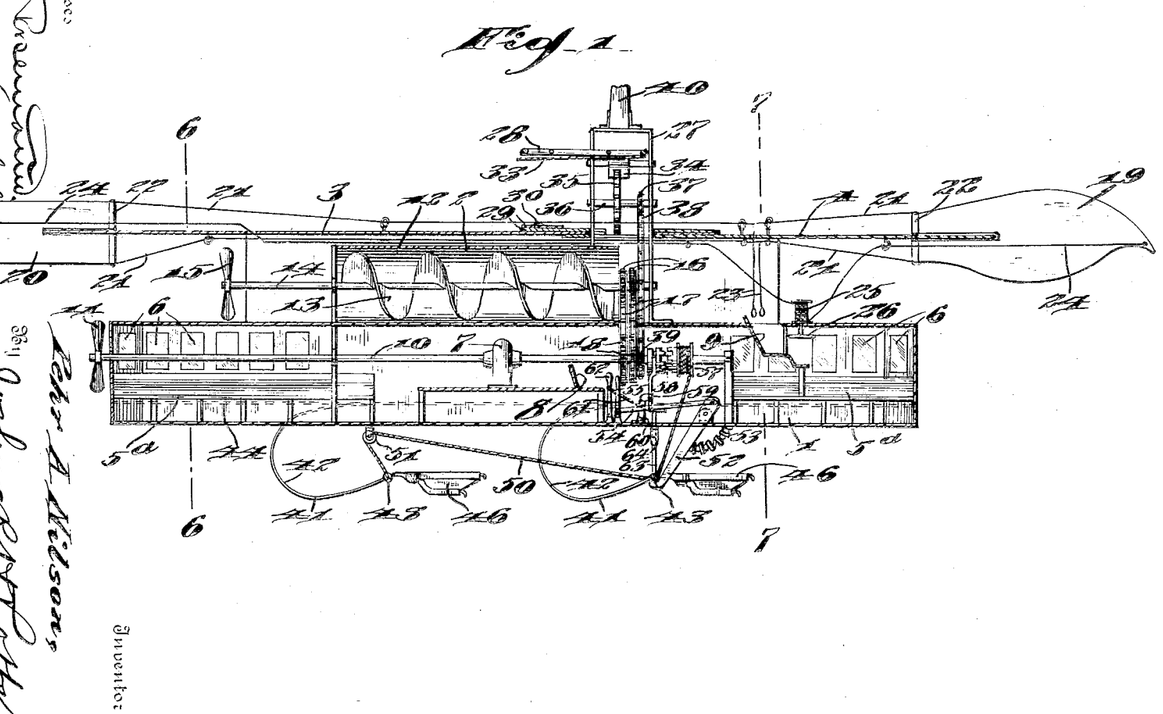
Figure 1, is a view in longitudinal section illustrating my improvements.
Figure 3:
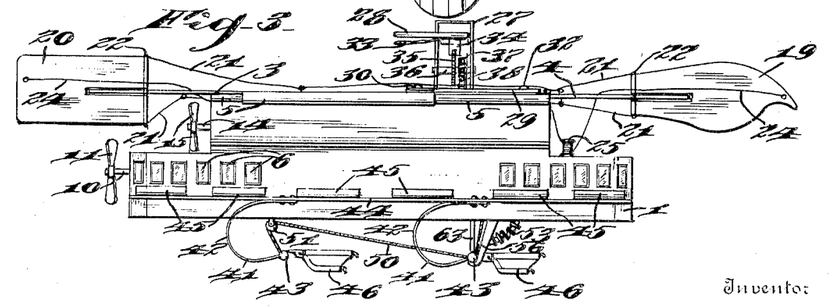
Fig. 3, is a view in side elevation on a reduced scale.
Figure 4:
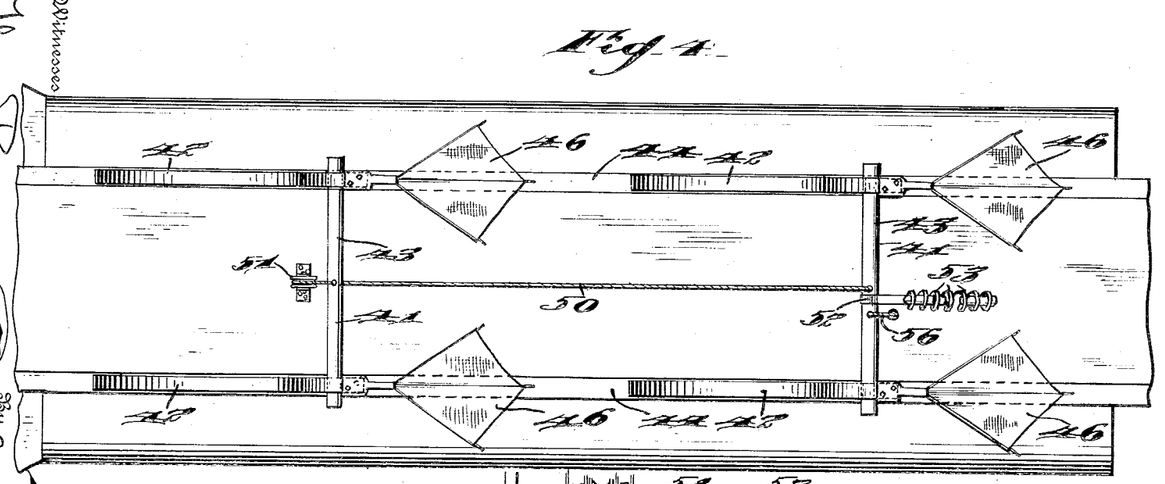
Fig. 4, is an enlarged fragmentary bottom plan view.
Figure 5:
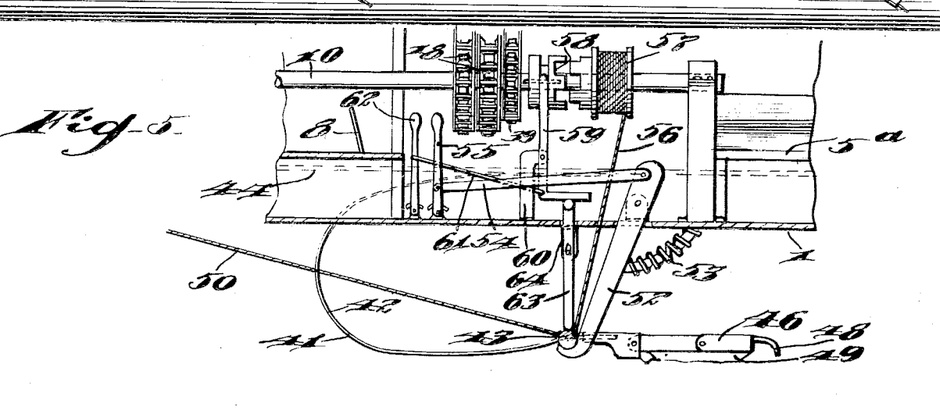
Fig. 5, is an enlarged fragmentary view partly in longitudinal section and partly in elevation illustrating the kicker mechanism.
Figure 6:
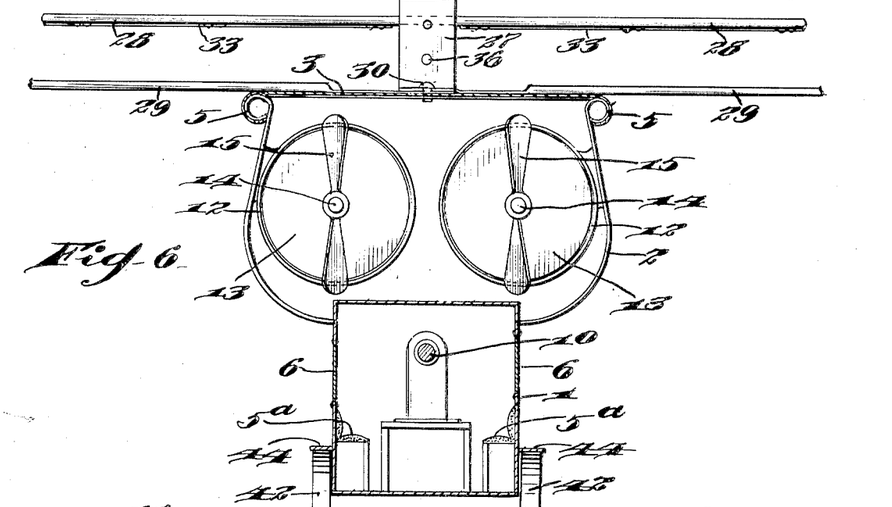
Fig. 6, is an enlarged sectional view on the line 6—6 of Fig. 1.
Figure 7:
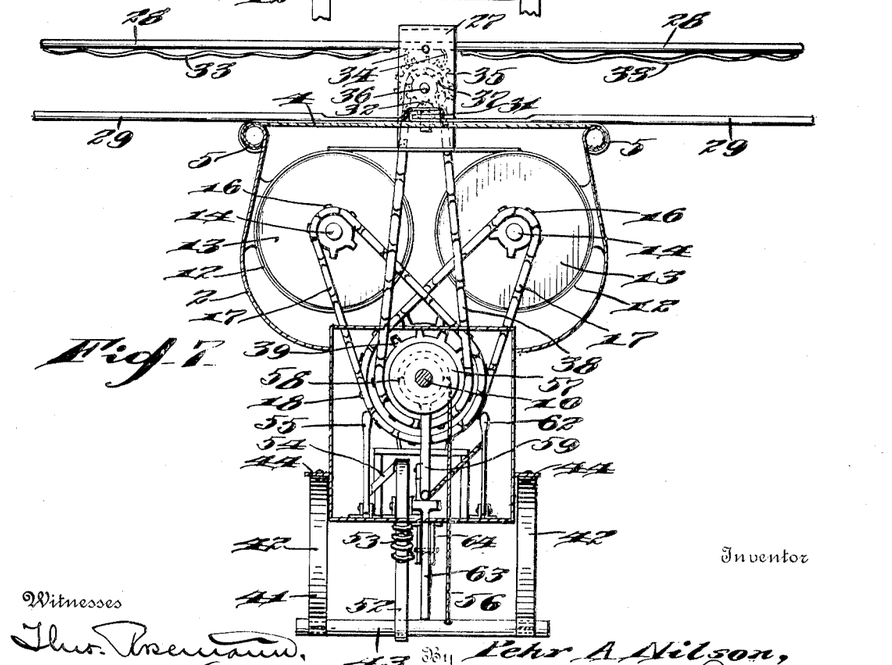
Fig. 7, is an enlarged sectional view on the line 7—7 of Fig. 1.
Figure 8:
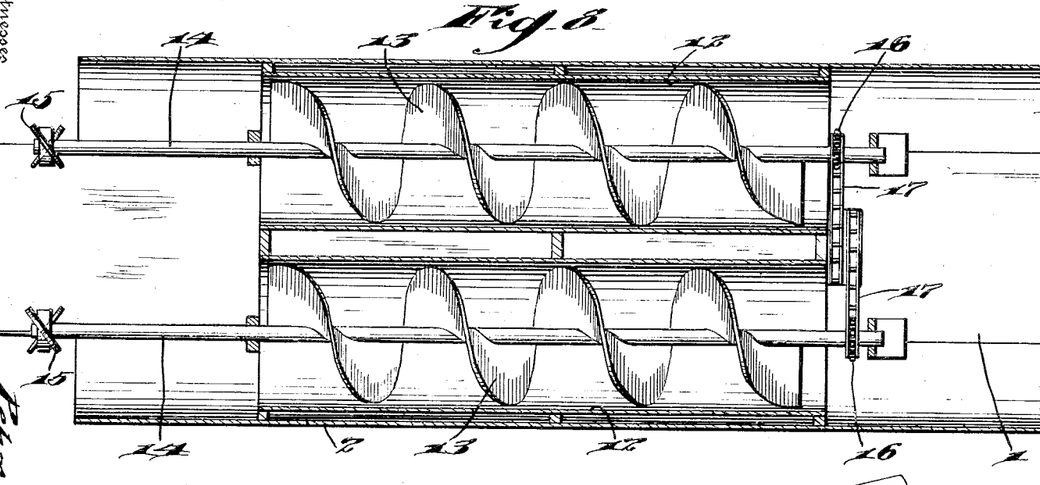
Fig. 8, is an enlarged fragmentary view in longitudinal section illustrating the worm or screw propellers.
Figure 9:
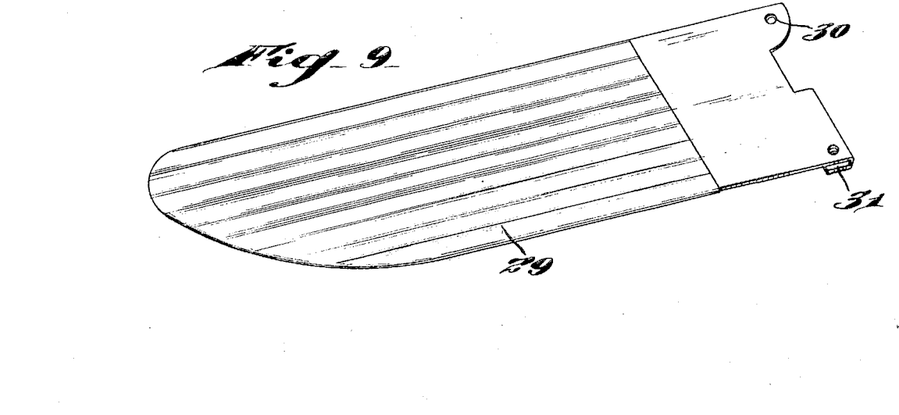
Fig. 9, is a perspective view of one of the wings.
Figure 10:
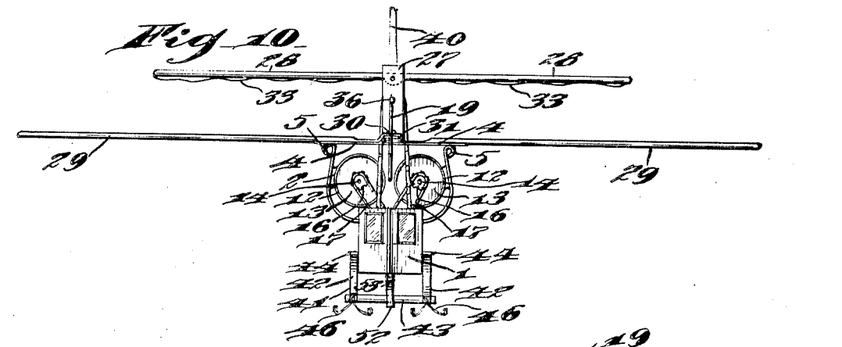
Fig. 10, is a view in end elevation on a reduced scale.

For convenience of description, I have divided the machine into a longitudinal lower body portion 1, an upper propeller casing 2, and telescoping top sections 3 and 4 fitted over tubular edges 5 of the propeller casing to telescope thereon and on each other, so that they may be readily removed when it is desired to store the machine. These telescoping top sections are metal plates, which are elastic, and are curved at their edges so that they slide onto the tubular edges 5, and onto each other, as seen in Figs. 1, and 3. In order to accomplish this telescoping action of the sections or plates, the rear section 3 has its rolled edge slightly larger than the rolled edge of plate 4.

The body 1, casing 2, and the top sections 3 and 4 are all preferably of sheet aluminum, so as to secure the least weight with the desired strength, and the ends of the body portion 1, which slope or incline to a point, constitute passenger compartments in which seats 5ª are provided, and windows of glass or mica 6 are located in said end portions.

7, represents the engine or motor located amidships controlled by the engineer, who is seated upon a chair 8, and 9 is a chair for the aviator located forward and in a higher plane than the seats for the passengers, these chairs or seats being positioned for the control of the ship in its several operations as will be hereinafter explained.

The motor or engine 7 drives a shaft 10 which extends through the body 1, and is preferably provided at its rear end with a propeller 11. In the propeller casing 2, two longitudinal cylinders 12, 12, are located and contain worm or screw propellers 13 which are secured upon shafts 14, and said shafts at their rear ends preferably provided with ordinary propellers 15. Shafts 14, at their forward ends, are connected by sprocket wheels 16 and sprocket chains 17, with sprocket wheels 18 on drive shaft 10, so that when the engine or motor is running all of the propellers are moving.

The top plate sections 3 and 4 as above stated are flexible, and at their ends project beyond the ends of the propeller casing 2, so that they may be bent vertically to guide the machine up or down. On these ends pivoted vanes 19 and 20 respectively are mounted, and are adapted to guide the machine to right and left.

The bending of the ends vertically is controlled by wires 21, which connect to the respective ends of the pivot pins 22 of vanes 19 and 20, and are controlled by cords or hangers 23. The vanes 19 and 20 are swung to the right and left by means of cords 24, which connect with a drum 25 operated by means of a hand wheel 26. This hand wheel 26 and the hangers 23 are in close proximity to the aviator's seat 9, so that he may readily control the direction of flight.

While I refer to the parts 21 and 24 as cords, it is probable that these parts will be wire, but the invention is in no wise limited to any particular form of flexible connecting device.

Figure 2:
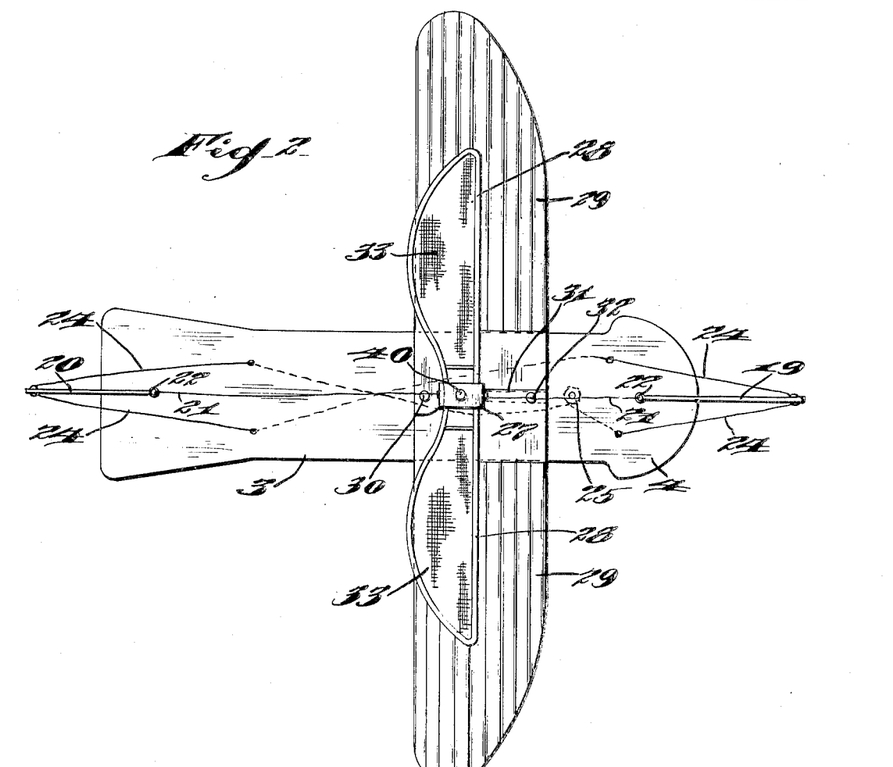
Fig. 2, is a top plan view on a reduced scale.

In the frame 27, which projects up through the body of the machine, a vibrator 28 is pivotally supported between its ends, and to the top of the body laterally projecting wings 29 are connected. These wings are hinged at one edge as shown at 30, and are adapted to be swung back to occupy small space. In normal position, however, they are swung to the position shown in Fig. 2, at right angles to the body of the ship, and are provided with interlocking flanges 31 secured by a bolt 32.

The vibrator 28 comprises a double winged structure consisting of a wire or metal outline having sheets 33 of flexible material secured to said outline at the forward edges of the wings only. These flexible sheets operate as flap valves, opening as the wings move upwardly, and closing when the wings move downwardly, so that the downward movement of the wings exerts a pressure on the air, while the upward movement of the wings is comparatively free from pressure on the air.

On the under face of the double wings or vibrator at the center thereof, depending lugs 34 are secured, and constituting an escapement device in connection with a star wheel 35, so that as the star wheel 35 revolves, it causes the vibrator to move upwardly and downwardly from its central fulcrum point. This star wheel and lugs operate the same as the ordinary escapement motion of a clock, so that the rapid revolution of the star wheel causes an oscillation of the vibrator, and this movement of the vibrator has a lifting tendency to elevate the flying machine.

The star wheel 35 is secured upon a shaft 36, mounted in the frame 27, and on this shaft 36 a small sprocket wheel 37 is secured and is connected by a chain 38 with a relatively large sprocket wheel 39 on shaft 10. On top of the frame 27, an upwardly projecting post 40 is provided and may be used in connection with a wireless telegraph instrument if desired. At the bottom of the body 1, spring kickers 41 are located, the function of which is to toss or kick the machine into the air so that it may immediately begin its flight without a long run over the ground, which is necessary with the machines in use.

Figures 11, 13:
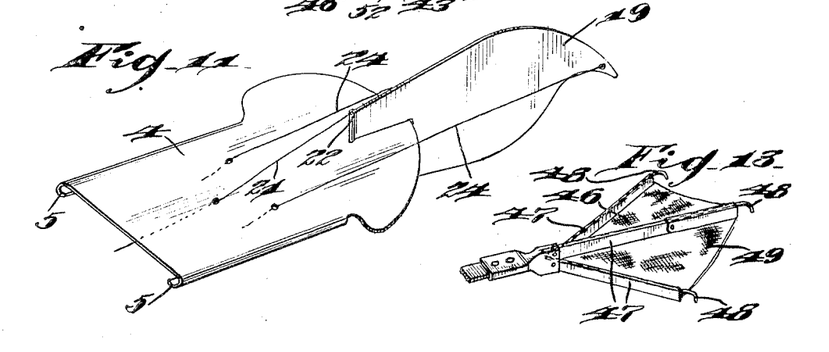
Figs. 11, and 12, are perspective views of the two telescoping top plates.
Fig. 13, is a perspective view of one of the web feet.
Figure 12:
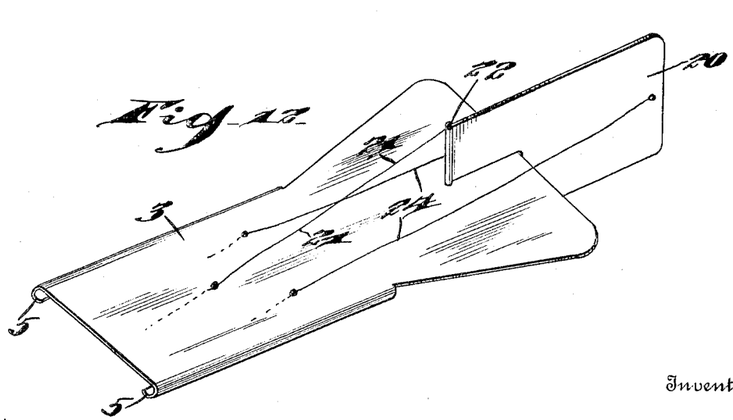

Each kicker comprises two flat springs 42 which are connected by a cross rod 43. The ends of these springs are secured to longitudinal flanges 44 on the sides of the body 1, and these flanges are also constructed to support longitudinal tanks 45 which may contain gasolene to run the engine, or may be filled with gas to aid in supporting the machine on the water. The ends of these springs 42 extend beyond the rods 43, and are secured to what I term "web feet" 46. One of these web feet is shown in perspective in Fig. 13, and comprises a plurality of hinged toes 47, constituting a frame, which are held in operative position by springs 48, the forward free ends of which being bent down forming sharp nails.

A sheet of flexible material 49 connects the toes 47, forming a web foot which collapses when moved in one direction, and becomes extended when moved in the other direction, the advantages of which being more fully hereinafter pointed out.

While I am not limited to any particular number of kickers, the drawings illustrate two, the cross rods 43 of which being connected by a rope or cable 50 which is passed over a pulley 51 on the bottom of the body to compel said kickers to operate in unison.

To hold the kickers in set position, a hook 52 is provided and is held in set position by a spring 53 to engage under the rod 43 of the forward kicker. This hook 52 is connected by a rod 54 with a lever 55, the latter located adjacent the engineer's seat 8, so that he may release the kickers at will.

To move the kickers to set position, a rope or cable 56 is secured to the cross rod 43 of the forward kicker, and is wound upon a drum 57 loose on the drive shaft 10. This drum 57 is locked by a clutch 58 to the shaft 10, so as to compel it to wind the cable 56 to draw the kickers to set position.

Clutch 58 is operated by an L-shaped lever 59 pivotally supported on a bracket 60, and said lever connected by a link 61 with a hand lever 62, also located adjacent the engineer's seat 8. To compel this lever to release the drum automatically when the kickers are moved to set position, a vertically movable plunger 63 is supported in a hanger 64 on the body 1, and is adapted to engage the L-shaped lever 59 so that when the cross rod 43 of the kicker reaches its set position, it will move this lever 59 so as to release the clutch 58 and drum 57. This is very essential as the driven shaft is moving rapidly and the kickers will be quickly drawn to set position, and their operation and release may be quickly performed in propelling the ship through the water when the web feet will operate like the web feet of any water fowl so as to propel the ship.

If the springs are of sufficient strength, and the web feet large enough, they will lift the machine right out of the water and allow it to begin its flight whenever desired. The toe nails are also efficacious in starting on the land, as they grip the ground and allow no slipping movement.

The operation is as follows: We will assume that the passengers are all in the machine and the engineer and aviator in their respective seats. The aviator signals the engineer to start his engine, and all of the propellers are started. When the propellers are all in motion, the aviator signals the engineer to release the kickers. This he does by pulling on the lever 55, which pulls back the hook 52. The springs 42 will then give the machine a lifting action, so that it may begin its flight from a fixed point. The engineer then throws the lever 62 to operate the clutch 58, and draw the kickers into set position as above explained, so that when the machine is ready to alight on the ground, it will alight on the springs and move easily and gracefully along. If desired, the aviator may stop the machine and allow it to rest on the water, as the machine will float easily, and whenever desired the web feet of the kickers will lift the machine out of the water and the ship may proceed on its journey. If while sailing through the air, the aviator wishes to lessen the speed or to stand practically still in the air, he places the vibrator 28 in operation, which he may do through the medium of any suitable clutch arrangement (not shown). As the machine flies through the air, the operator controls its flight by moving the several steering planes and ends both fore and aft, and the response to the aviator's control is therefore rapid and the machine is always under his control.

It is my intention to so construct an air ship that it is designed for carrying a large number of passengers, and providing for such passengers every convenience and every safety device, but I do not limit myself to any particular size as it may be made small enough to serve as a toy. I do not limit myself therefore to the materials used, nor to any of the various details of construction, but consider myself at liberty to make such changes and alterations as fairly fall within the spirit and scope of the appended claims.

Having thus described my invention, what I claim as new and desire to secure by Letters Patent is:

1. In a flying machine, the combination with a body, telescoping metal top plates forming a cover on said body and projecting at their ends beyond the body and flexible, means for bending said ends up and down to steer the machine vertically, and means for steering the machine from right to left, substantially as described.

2. In a flying machine, the combination with a body, telescoping metal top plates forming a cover on said body and projecting at their ends beyond the body and flexible, means for bending said ends up and down to steer the machine vertically, vanes pivoted on said ends, and means for moving said planes to right and left, substantially as described.

3. In a flying machine, the combination with a body, telescoping metal top plates forming a cover on said body and projecting at their ends beyond the body and flexible, means for bending said ends up and down to steer the machine vertically, and means for simultaneously moving said vanes to right and left, substantially as described.

4. In a flying machine, the combination with a body, telescoping top plates on said body projecting at their ends beyond the body and flexible, means for bending said ends up and down to steer the machine vertically, means for steering the machine from right to left, laterally projecting wings on said body hinged together, and means for locking said wings in normal position, substantially as described.

5. In a flying machine, the combination with a body, telescoping top plates on said body projecting at their ends beyond the body and flexible, means for bending said ends up and down to steer the machine vertically, vanes pivoted on said ends, means for moving said ends vertically, means for moving said vanes to right and left, laterally projecting wings on said body hinged together, and means for locking said wings in normal position, substantially as described.

6. In a flying machine, the combination with a body, telescoping top plates on said body projecting at their ends beyond the body and flexible, means for bending said ends up and down to steer the machine vertically, vanes pivoted on said ends, means for simultaneously moving said vanes to right and left, laterally projecting wings on said body hinged together, and means for locking said wings in normal position, substantially as described.

7. In a flying machine, the combination with a body, telescoping top plates on said body projecting at their ends beyond the body and flexible, means for bending said ends up and down to steer the machine vertically, means for steering the machine from right to left, an upwardly projecting frame on the body, a vibrator mounted between its ends on said frame, and means for oscillating said vibrator, substantially as described.

8. In a flying machine, the combination with a body, telescoping top plates on said body projecting at their ends beyond the body and flexible, means for bending said ends up and down to steer the machine vertically, vanes pivoted on said ends, means for moving said ends vertically, means for moving said vanes to right and left, an upwardly projecting frame on the body, a vibrator mounted between its ends on said frame, and means for oscillating said vibrator, substantially as described.

9. In a flying machine, the combination with a body, telescoping top plates on said body projecting at their ends beyond the body and flexible, means for bending said ends up and down to steer the machine vertically, vanes pivoted on said ends, means for simultaneously moving said vanes to right and left, an upwardly projecting frame on the body, a vibrator mounted between its ends on said frame, and means for oscillating said vibrator, substantially as described.

10. In a flying machine, the combination with a body, telescoping top plates on said body projecting at their ends beyond the body and flexible, means for bending said ends up and down to steer the machine vertically, means for steering the machine from right to left, laterally projecting wings on said body hinged together, means for locking said wings in normal position, an upwardly projecting frame on the body, a vibrator mounted between its ends on said frame, and means for oscillating said vibrator, substantially as described.

11. In a flying machine, the combination with a body, telescoping top plates on said body projecting at their ends beyond the body and flexible, means for bending said ends up and down to steer the machine vertically, vanes pivoted on said ends, means for moving said vanes to right and left, laterally projecting wings on said body hinged together, means for locking said wings in normal position, an upwardly projecting frame on the body, a vibrator mounted between its ends on said frame, and means for oscillating said vibrator, substantially as described.

12. In a flying machine, the combination with a body, telescoping top plates on said body projecting at their ends beyond the body and flexible, means for bending said ends up and down to steer the machine vertically, vanes pivoted on said ends, means for simultaneously moving said vanes to right and left, laterally projecting wings on said body hinged together, means for locking said wings in normal position, an upwardly projecting frame on the body, a vibrator mounted between its ends on said frame, and means for oscillating said vibrator, substantially as described.

13. In a flying machine, the combination with a body, of a top on the body projecting at both ends beyond the body, vanes pivoted on said ends, means for moving said ends upwardly and downwardly, and means for pivoting said vanes, substantially as described.

14. In a flying machine, the combination with a body, of a sliding metal top on the body projecting at both ends beyond the body, vanes pivoted on said ends, means for moving said ends upwardly and downwardly, and means for pivoting said vanes, substantially as described.

15. In a flying machine, the combination with a body, of a top on the body projecting at both ends beyond the body, vanes pivoted on said ends, means for moving said ends upwardly and downwardly, and means for pivoting said vanes, said top comprising two plates, slidably mounted on the body, substantially as described.

16. In a flying machine, the combination with a body, of a sliding metal top on the body projecting at both ends beyond the body, vanes pivoted on said ends, means for moving said ends upwardly and downwardly, means for pivoting said vanes, said top comprising two plates, slidably mounted on the body, substantially as described.

17. In a flying machine, the combination with a sheet metal body having rolled upper longitudinal edges, a cover having rolled side edges mounted to slide on the edges of the body, said cover projecting at its ends beyond the body, pivoted vanes on the ends of the cover, means for moving the ends of the cover upwardly and downwardly, and means for swinging said vanes, substantially as described.

18. In a flying machine, the combination with a sheet metal body having rolled upper longitudinal edges, a cover having rolled side edges mounted to slide on the edges of the body, said cover projecting at its ends beyond the body, pivoted vanes on the ends of the cover, means for moving the ends of the cover upwardly and downwardly, means for swinging said vanes, said cover comprising two plates, one of slightly greater width than the other and telescoping on the other, substantially as described.

19. In a flying machine, the combination with a body, of a top on the body projecting at both ends beyond the body, vanes pivoted on said ends, means for moving said ends upwardly and downwardly, means for pivoting said vanes, metal wings pivotally secured together and to said top, interlocking flanges on said wings adapted to secure them in alinement and transversely to the body, and a bolt positioned through said interlocking flanges, and locking the wings together, said wings adapted to be folded backward on the body, substantially as described.

20. In a flying machine, the combination with a body, of a sliding metal top on the body projecting at both ends beyond the body, vanes pivoted on said ends, means for moving said ends upwardly and downwardly, and means for pivoting said vanes, metal wings pivotally secured together and to said top, interlocking flanges on said wings adapted to secure them in alinement and transversely to the body, and a bolt positioned through said interlocking flanges, and locking the wings together, said wings adapted to be folded backward on the body, substantially as described.

21. In a flying machine, the combination with a body, of a top on the body projecting at both ends beyond the body, vanes pivoted on said ends, means for moving said ends upwardly and downwardly, means for pivoting said vanes, said cover comprising two plates, slidably mounted on the body, metal wings pivotally secured together and to said top, interlocking flanges on said wings adapted to secure them in alinement and transversely to the body, and a bolt positioned through said interlocking flanges and locking the wings together, said wings adapted to be folded backward on the body, substantially as described.

22. In a flying machine, the combination with a body, of a sliding metal top on the body projecting at both ends beyond the body, vanes pivoted on said ends, means for moving said ends upwardly and downwardly, means for pivoting said vanes, said cover comprising two plates, slidably mounted on the body, metal wings pivotally secured together and to said top, interlocking flanges on said wings adapted to secure them in alinement and transversely to the body, and a bolt positioned through said interlocking flanges and locking the wings together, said wings adapted to be folded backward on the body, substantially as described.

23. In a flying machine, the combination with a sheet metal body having rolled upper longitudinal edges, a cover having rolled side edges mounted to slide on the edges of the body, said cover projecting at its ends beyond the body, pivoted vanes on the ends of the cover, means for moving the ends of the cover upwardly and downwardly, means for swinging said vanes, metal wings pivotally secured together and to said top, interlocking flanges on said wings adapted to secure them in alinement and transversely to the body, and a bolt positioned through said interlocking flanges and locking the wings together, said wings adapted to be folded backward on the body, substantially as described.

24. In a flying machine, the combination with a sheet metal body having rolled upper longitudinal edges, a cover having rolled side edges mounted to slide on the edges of the body, said cover projecting at its ends beyond the body, pivoted vanes on the ends of the cover, means for moving the ends of the cover upwardly and downwardly, means for swinging said vanes, said cover comprising two plates, one of slightly greater width than the other and telescoping on the other, metal wings pivotally secured together and to said top, interlocking flanges on said wings adapted to secure them in alinement and transversely to the body, and a bolt positioned through said interlocking flanges and locking the wings together, said wings adapted to be folded backward on the body, substantially as described.

In testimony whereof I have signed my name to this specification in the presence of two subscribing witnesses.

PEHR A. NILSON.

Witnesses:
R. H. KRENKEL,
C. E. POTTS.